US006761979B2

(12) United States Patent
Yokochi et al.

(10) Patent No.: US 6,761,979 B2
(45) Date of Patent: Jul. 13, 2004

(54) DECORATIVE SHEET AND DECORATIVE MATERIAL

(75) Inventors: Eiichirou Yokochi, Tokyo-To (JP); Hajime Takeuchi, Tokyo-To (JP)

(73) Assignee: DAI Nippon Printing Co., Ltd. (JP)

( * ) Notice: Subject to any disclaimer, the term of this patent is extended or adjusted under 35 U.S.C. 154(b) by 227 days.

(21) Appl. No.: 09/818,938

(22) Filed: Mar. 28, 2001

(65) Prior Publication Data

US 2002/0182429 A1 Dec. 5, 2002

(30) Foreign Application Priority Data

Mar. 31, 2000 (JP) ....................................... 2000-096504
Nov. 17, 2000 (JP) ....................................... 2000-350913

(51) Int. Cl.$^7$ .......................... B32B 27/10; B32B 23/08
(52) U.S. Cl. ..................... 428/514; 428/511; 428/537.5
(58) Field of Search .............................. 428/537.5, 480, 428/482, 511, 514

(56) References Cited

U.S. PATENT DOCUMENTS 5,654,091 A * 8/1997 Kiriazis et al. ............. 428/332
5,968,695 A * 10/1999 Gula et al. ..................... 430/56
6,240,230 B1 * 5/2001 Szum ......................... 385/100

* cited by examiner

*Primary Examiner*—Monique R. Jackson
(74) *Attorney, Agent, or Firm*—Parkhurst & Wendel, L.L.P.

(57) ABSTRACT

A decorative sheet using a paper substrate is provided which, even in the case of the adoption of a construction such that a surface resin layer has been formed by crosslinking through an ionizing radiation irradiation to improve surface properties such as abrasion resistance, does not cause an unfavorable phenomenon such that the workability is lowered due to a deterioration in strength of the paper substrate caused by the ionizing radiation and, consequently, the sheet is broken at the time of lamination. A decorative sheet S comprises, stacked in the following order from the top surface toward the back surface, a surface resin layer 4 formed of a crosslinked product of an ionizing radiation-curable resin, a paper substrate 1, and a high-modulus resin layer 2 having a tensile strength of not less than 40 MPa as measured according to JIS K 6301. A pattern layer 3 or the like may be additionally provided. The use of a needle-leaved tree pulp as the paper substrate is preferred from the viewpoint of strength. Further, the paper substrate preferably comprises a pulp which has a carboxyl or carbonyl group at a cut end created by the cleavage of a cellulose molecule. The lamination of this decorative sheet onto an adherend substrate with the aid of an adhesive can provide a decorative material such as a decorative plate.

14 Claims, 3 Drawing Sheets

DECORATIVE SHEET AND DECORATIVE MATERIAL

TECHNICAL FIELD

The present invention relates to a decorative sheet for use, for example, in building interior materials, such as walls, and surface materials of, for example, fittings, such as doors, and furniture, and a decorative material comprising the decorative sheet laminated onto a substrate. More particularly, the present invention relates to a decorative sheet which is good in surface properties, such as abrasion resistance, as well as in processability and, when laminated onto a substrate as an adherend (an adherend substrate), is less likely to be broken, and a decorative material comprising the decorative sheet laminated onto the adherend substrate.

BACKGROUND OF THE INVENTION

In general, surface properties, such as abrasion resistance and stain resistance, have hitherto been required of decorative sheets used in the above applications. In order to cope with this, for example, Japanese Patent Publication No. 31033/1974 discloses a decorative sheet which has been produced by printing a pattern layer on a paper substrate, coating an unsaturated polyester prepolymer (an ionizing radiation-curable resin) coating composition onto the surface of the printed substrate to form a coating, and then applying an electron beam to the coating to cause crosslinking and curing of the coating, thereby forming a surface resin layer as a surface layer.

When the surface resin layer, which has been formed by crosslinking and curing an ionizing radiation-curable resin comprising a monomer, a prepolymer or the like by applying an ionizing radiation, such as an electron beam, is provided as a surface layer constituting the outermost surface of a decorative sheet, the high degree of crosslinking can provide a decorative sheet possessing excellent surface properties such as excellent abrasion resistance and stain resistance.

In the above decorative sheet, however, upon the application of an ionizing radiation for crosslinking the surface resin layer, the cellulose molecule of the pulp in the paper substrate is broken, and a carboxyl group or a carbonyl group is produced at the cut end. As a result, the strength of the paper substrate is deteriorated, and the processability of the decorative sheet is disadvantageously lowered. More specifically, when a decorative sheet is press-laminated by means of a roller, for example, onto an adherend substrate, such as a plywood while interposing an adhesive between the decorative sheet and the adherend substrate, the decorative sheet is sometimes broken, for example, due to an increase in tension applied to the decorative sheet and mechanical vibration. In particular, when a decorative sheet is applied, for example, by lapping, onto an adherend substrate in its curved surface or a prismatic adherend substrate in its corner portion, a local stress concentration takes place in the decorative sheet. Therefore, the decorative sheet is likely to break.

In view of the above problems, it is an object of the present invention to improve the processability of a decorative sheet comprising a paper substrate bearing a surface resin layer formed of a crosslinked product of an ionizing radiation-curable resin, for improving surface properties such as abrasion resistance, and to provide a decorative material with this decorative sheet being laminated thereonto.

DISCLOSURE OF THE INVENTION

According to the present invention, there is provided a decorative sheet comprising a stack of:

(1) a surface resin layer formed of a crosslinked product of an ionizing radiation-curable resin; and (2) a combinational layer comprising a combination of a paper substrate and a high-modulus resin having a tensile strength of not less than 40 MPa as measured according to JIS K 6301.

Further, according to the present invention, there is provided a decorative material comprising the above decorative sheet laminated onto an adherend substrate.

In this way, by virtue of the combination of a paper substrate with a high-modulus resin, the strength of the whole decorative sheet can be maintained even when the strength of the paper substrate is deteriorated due to the cleavage of the cellulose molecule of the pulp in the paper substrate upon the application of an ionizing radiation at the time of the formation of the surface resin layer. This can realize a decorative sheet which possesses surface properties such as abrasion resistance exerted by the surface resin layer and, at the same time, possesses good processability. Therefore, in laminating the decorative sheet onto an adherend substrate, for example, by means of a roll laminator, it is possible to prevent the decorative sheet from being broken, for example, due to mechanical vibration or a shock caused in the case where the carrying of a decorative sheet in a continuous strip form, every time when applied onto an adherend substrate (in a sheet form), is stopped to cut the decorative sheet, specifically an instantaneous increase in tension.

The high-modulus resin is preferably combined with the paper substrate by a method wherein the high-modulus resin layer is formed on the surface of the paper substrate, or by impregnating the high-modulus resin into the paper substrate. When the high-modulus resin layer is formed on the surface of the paper substrate, the high-modulus resin layer may be formed on the top surface side of the paper substrate, that is, on the paper substrate in its surface resin layer side, or alternatively may be formed on the backside of the paper substrate, that is, on the paper substrate in its side remote from the surface resin layer. On the other hand, in the impregnation of the high-modulus resin into the paper substrate, the high-modulus resin may be impregnated into the paper substrate in its top surface side or back surface side, or alternatively may be impregnated into the whole paper substrate.

Preferably, in the decorative sheet having the above construction according to the present invention, the paper substrate is formed of a needle-leaved tree pulp. As compared with the use of the broad-leaved tree pulp, the use of the needle-leaved tree pulp in the paper substrate can increase the strength of the paper substrate, and, thus, even when the strength is deteriorated by the application of an ionizing radiation, the strength of the decorative sheet can be further improved.

Further, in any one of the above constructions of the decorative sheet according to the present invention, preferably, the paper substrate comprises a pulp which has at least one of carboxyl and carbonyl groups at a cut end formed as a result of the cleavage of a cellulose molecule.

According to the present invention, the use of the paper substrate formed of this pulp can maximize the effect of the high-modulus resin layer.

This decorative material possesses excellent surface properties, such as excellent abrasion resistance, and, at the same time, is less likely to cause troubles, such as sheet breaking, at the time of the application of the decorative sheet onto the adherend substrate and thus can be produced in high yield.

DESCRIPTION OF THE PREFERRED EMBODIMENTS

Preferred embodiments of the decorative sheet and the decorative material according to the present invention will be described.

FIG. 1 is a cross-sectional view showing several embodiments of the decorative sheet according to the present invention.

Figure 1A:
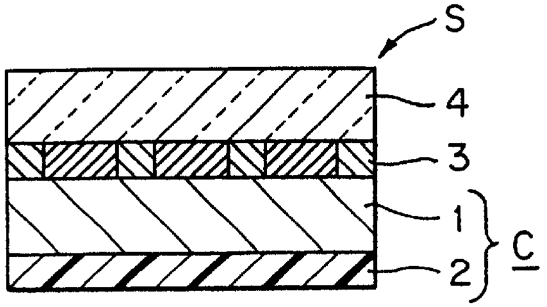
FIG. 1 is a cross-sectional view showing one embodiment of the decorative sheet according to the present invention.

A decorative sheet S illustrated in FIG. 1A comprises a surface resin layer 4, a pattern layer 3, a paper substrate 1, and a high-modulus resin layer 2 having specific mechanical properties stacked on top of one another in that order from the top surface towards the back surface. In this embodiment, the paper substrate 1 and the high-modulus resin layer 2 constitute a combinational layer C.

Figure 1B:
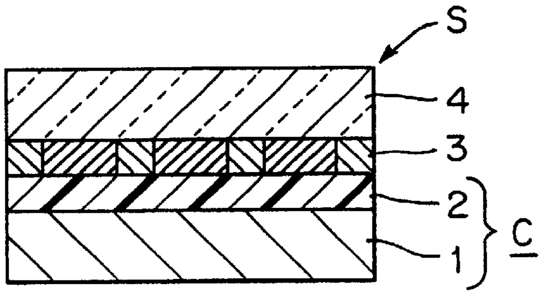

A decorative sheet S illustrated in FIG. 1B comprises a surface resin layer 4, a pattern layer 3, a high-modulus resin layer 2 having specific mechanical properties, and a paper substrate 1 stacked on top of one another in that order from the top surface towards the back surface. The decorative sheet in this embodiment is different from the decorative sheet shown in FIG. 1A in that the positions of the paper substrate 1 and the high-modulus resin layer 2 are reversed.

Figure 1C:
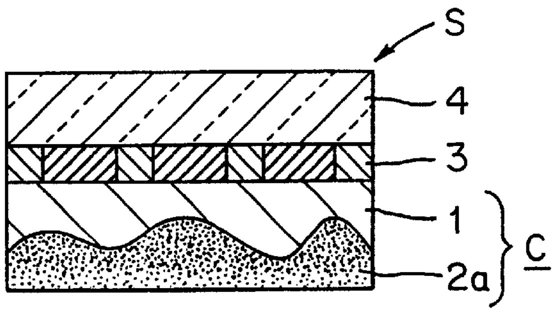
Figure 1D:
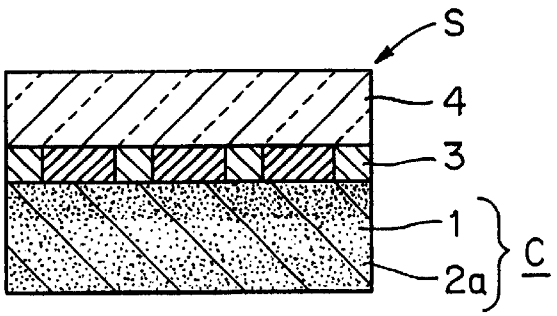

FIG. 1C shows a decorative sheet according to the present invention which is provided with a combinational layer C comprising a high-modulus resin 2*a* impregnated into a paper substrate 1. In this embodiment, the high-modulus resin 2*a* has been impregnated into the paper substrate 1 in its surface remote from the surface layer. Alternatively, as shown in FIG. 1D, the high-modulus resin 2*a* may be impregnated into the whole paper substrate 1, or the high-modulus resin 2*a* may be impregnated into the paper substrate 1 in its surface on the surface layer side.

Figure 2:
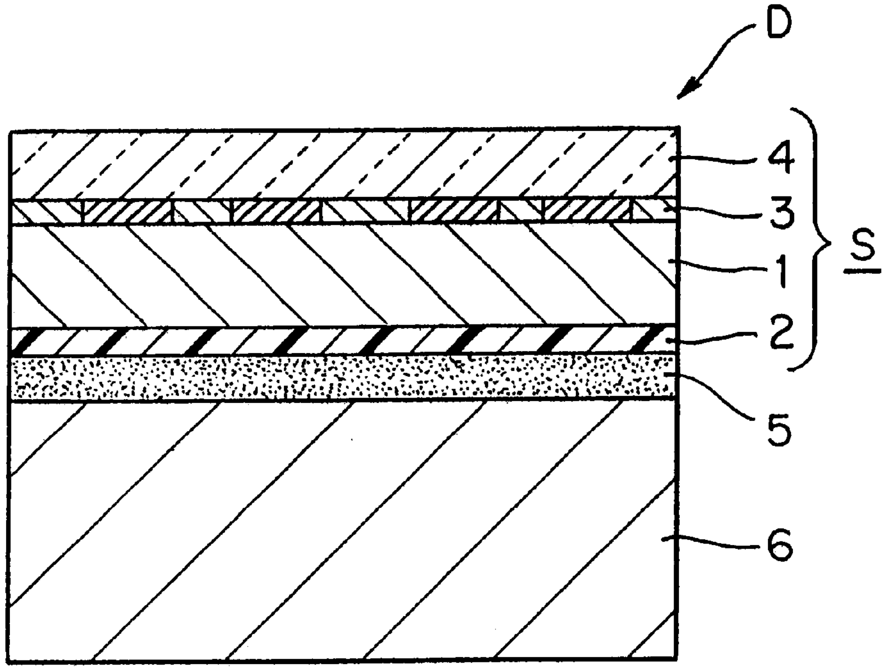
FIG. 2 is a cross-sectional view showing one embodiment of the decorative material according to the present invention.

FIG. 2 is a cross-sectional view showing one embodiment of the decorative material according to the present invention. The decorative material D shown in FIG. 2 has a construction such that the decorative sheet S as shown in FIG. 1A is laminated onto the adherend substrate 6 through an adhesive layer 5 in such a manner that the high-modulus resin layer 2 located on the backside of the decorative sheet S faces the adherend substrate 6.

As shown in FIGS. 1A to 1D, the decorative sheet S according to the present invention comprises the combinational layer C, composed of the paper substrate 1 and the high-modulus resin, and the surface resin layer 4 as the surface layer. In general, however, as shown in the drawings, in addition to the above elements, a pattern layer 3 is further provided.

The high-modulus resin layer 2 or the high-modulus resin 2*a* is one which can compensate for a deterioration in strength of the paper substrate caused by an ionizing radiation at the time of the formation of a crosslinked product of the surface resin layer 4.

When the resin in the surface resin layer is crosslinked, an ionizing radiation is generally applied from the surface resin layer side to the paper substrate. At that time, the strength of the paper substrate is deteriorated from the surface resin layer side. For this reason, the high-modulus resin layer 2 is advantageously provided on the top surface side of the paper substrate 1, that is, on the paper substrate 1 in its surface resin layer 4 side from the viewpoint of increasing the strength. Alternatively, the high-modulus resin layer 2 may be provided on the backside of the paper substrate, or the high-modulus resin may be impregnated into the paper substrate on its backside. By virtue of the adoption of this construction, the formation of the surface resin layer 4 on the paper substrate 1 may be followed by the formation of the high-modulus resin layer on the paper substrate 1 in its side remote from the surface resin layer, or the impregnation of the high-modulus resin into the paper substrate 1 in its side remote from the surface resin layer. This can increase the degree of freedom in the production of the decorative sheet.

Among these layers, the pattern layer 3 is an optionally provided layer, and the provision of the pattern layer 3 may be omitted if this is unnecessary. If necessary, other suitable layers may be provided from the viewpoints of properties, suitability for production and the like. For example, a primer layer may be provided between the pattern layer 3 and the surface resin layer 4, or a sealer layer may be provided between the pattern layer 3 and the paper substrate 1.

These layers will be described in more detail.

[Paper Substrate]

Conventional base papers for decorative papers, such as impregnated papers or non-impregnated papers, may be used as the paper substrate 1. The effect of the present invention is strongly developed particularly when a paper substrate formed of pulp is used in which the cellulose molecule of the pulp is cleaved by an ionizing radiation (particularly an electron beam), which has penetrated the paper substrate at the time of crosslinking-curing of the surface resin layer, to produce a carboxyl or carbonyl group at the cut end, whereby the strength is lowered. Paper substrates include, for example, papers such as tissue paper, reinforced paper, kraft paper, wood free paper, linter paper, baryta paper, parchment paper, and Japanese paper. According to the present invention, the provision of the high-modulus resin layer can compensate for the strength of the paper substrate. Therefore, the use of the reinforced paper, which is inexpensive although the strength is relatively low, is preferred from the viewpoint of cost. The paper substrate used in the decorative sheet according to the present invention generally has a basis weight of about 20 to 150 $g/m^2$, that is, preferably has a thickness of about 20 to 200 $\mu m$.

Regarding the type of the pulp, the use of a broad-leaved tree (L material) pulp is preferred, for example, from the viewpoints of suitability for printing of the pattern layer or the like and homogeneity of the formation. Further, the use of a needle-leaved tree (N material) pulp is also preferred because, although the N material pulp is inferior to the L material pulp in suitability for printing and homogeneity of formation, the pulp strength is higher, making it possible to compensate for a lowering in pulp strength caused by an ionizing radiation (particularly an electron beam). Trees for broad-leaved tree pulps include oak, beech, birch, and eucalyptus, and trees for needle-leaved tree pulps include yezo spruce, red pine, fir, hemlock, and spruce. Further, for example, conventional sealer coating, calendering, and the addition of a color pigment may also be carried out from the viewpoint of compensating for a lowering in suitability for printing and homogeneity of the formation in the case of the needle-leaved tree pulp.

[High-Modulus Rein]

The high-modulus resin used in the decorative sheet according to the present invention is a high-modulus resin having a tensile strength of not less than 40 MPa (corresponding to about 400 kgf/cm$^2$) as measured according to JIS K 6301. This type of resin is not particularly limited so far as the resin satisfies at least the above mechanical property requirement. For example, thermoplastic resins and thermosetting resins may be used. Specifically, the high-modulus resin layer may be formed of a resin, satisfying the above mechanical property requirement, properly selected from resins, for example, polyolefin resins, such as (high-density) polyethylene and polypropylene (particularly isotactic polypropylene), acrylic resin, acrylurethane resin using acrylic polyol and isocyanate, other urethane resin, and polyester polyol resin. Among these resins, polyester polyol resin, particularly polyester polyol resin having an unsaturated bond in its molecule, is preferred. How to apply the high-modulus resin to the combinational layer according to the present invention is not particularly limited. For example, a coating liquid composed of a solution (or an emulsion) of such resin or a heat-melted resin may be coated onto a paper substrate to form a layer on the paper substrate. Alternatively, a method may be adopted wherein the properties, viscosity and the like of the coating liquid are regulated followed by impregnation into the paper substrate. Further, a method may be used wherein the resin as a raw material is once used to form a sheet which is then stacked onto the paper substrate by heat fusing or by interposing an adhesive between the resin sheet and the paper substrate. The high-modulus resin may be coated on any one side of the paper substrate or on both sides of the paper substrate. Alternatively, irrespective of the top surface or the back surface, the high-modulus rein may be impregnated into the whole paper substrate. The coverage of the high-modulus resin may vary depending upon the original strength of the paper substrate, the dose of ionizing radiation at the time of crosslinking of the surface resin layer, applications (required folding endurance) and the like. In general, however, the coverage is about 0.5 to 10 g/m$^2$ on a solid basis.

The combination of the paper substrate with the high-modulus resin can compensate for a deterioration in strength caused by the cleavage of the cellulose molecule of the paper substrate upon the application of an ionizing radiation (particularly an electron beam) at the time of crosslinking-curing of the surface resin layer formed on the paper substrate on its top surface side. Bringing the tensile strength of the high-modulus resin to not less than 40 MPa is preferred from the viewpoint of compensating for a lowering in processability of the decorative sheet due to the deterioration in strength. The upper limit of the tensile strength is not particularly limited. Since, however, the upper limit of the tensile strength of the conventional resin is 80 to 90 MPa, the upper limit of the tensile strength of the high-modulus resin is naturally on this level (about 90 MPa). This tensile strength is not the strength as the high-modulus resin layer integral with other layers constituting the decorative sheet, such as paper substrate, that is, not the strength as the decorative sheet, but a property value of the high-modulus resin per se. The tensile strength is measured by forming a single layer of the high-modulus resin layer and measuring the tensile strength for this single layer. A single layer of the high-modulus resin layer may be formed by coating a coating liquid, for example, onto a release sheet, for example, a polyethylene terephthalate film of which the surface has been treated with a release agent, such as wax, or other release sheet such as a silicone resin-coated release paper, rather than the paper substrate, to form a high-modulus resin layer (of which the thickness may be thicker than that of the high-modulus resin layer in the actual decorative sheet) and then separating only the high-modulus resin layer. In the present invention, the tensile strength as measured according to JIS K 6301 (Testing method for physical properties of vulcanized rubber) is a value as measured according to this standard.

The coating liquid for applying the high-modulus resin may optionally contain conventional extender pigments, colorants and the like for the regulation of properties such as suitability for coating, the rendering of a design or other purposes. When the covering (opacifying) power of the paper substrate is unsatisfactory, the incorporation of the colorant into the high-modulus resin coating liquid can apparently improve the covering power. Particularly when a transparent paper is used as the paper substrate, the full solid print layer of the pattern layer may be allowed to function also as the opacifying layer described later. When the high-modulus resin is applied as a layer, an independent layer may be formed wherein the high-modulus resin is not impregnated into the paper substrate at all, that is, does not permeate the paper substrate at all, and is adjacent to the paper substrate. The form of the high-modulus resin may be such that a part of the high-modulus resin has been impregnated into the paper substrate in such a manner that the high-modulus resin layer is overlapped and integrated with the paper substrate at a position around the interface of the high-modulus resin layer and the paper substrate. When the high-modulus resin is impregnated into the paper substrate, for example, a method may be adopted which comprises forming a high-modulus resin layer by coating onto any one of the top surface or back surface of the paper substrate and then impregnating the high-modulus resin layer into only a portion around the coated surface of the paper substrate, or into the paper substrate in its thicknesswise portion ranging from the portion around the coated surface to the surface of the paper substrate opposite to the coated side.

[Pattern Layer]

The pattern layer 3 is a layer for rendering a pattern or the like, and is generally provided. If the pattern layer 3 is unnecessary, the provision of the pattern layer 3 may be omitted. When the pattern layer is provided, there is no particular limitation on details of the pattern layer, for example, formation method, material, and pattern of the pattern layer. The pattern layer may be generally formed using an ink, for example, by a conventional printing method, such as gravure printing, silk screen printing, offset printing, gravure offset printing, or ink jet printing. The pattern may be, for example, a woodgrain pattern, a rift pattern, a sand pattern, a texture pattern, a tile-like pattern, a brick-like pattern, a leather-like crepe pattern, characters, symbols, a geometrical pattern, a full solid print, or a combination of two or more of these patterns. The full solid print may also be formed by coating using a coating liquid. The ink (or a coating liquid) used in the formation of the pattern layer generally comprises a vehicle comprising a binder and the like, a colorant, such as a pigment or a dye, and various optional additives added thereto, such as an extender pigment, a stabilizer, a plasticizer, a catalyst, or a curing agent. The resin as the binder may be properly selected from thermoplastic resins, thermosetting resins, ionizing radiation-curable resins and the like according to required properties, suitability for printing and the like. Binder resins usable herein include, for example, cellulosic resins, such as nitrocellulose, cellulose acetate, and cellulose acetate propionate, acrylic resins, such as polymethyl (meth) acrylate, polybutyl (meth)acrylate, and methyl (meth) acrylate/butyl (meth)acrylate/2-hydroxyethyl (meth)acrylate copolymer, urethane resin, vinyl chloride-vinyl acetate copolymer, polyester resin, and alkyd resin. They may be used solely or as a mixture containing one or two or more of them. Colorants usable herein include: inorganic pigments, such as titanium white, carbon black, black iron oxide, red oxide, chrome yellow, and ultramarine blue; organic pigments, such as aniline black, quinacridone red, isoindolinone yellow, and phthalocyanine blue; luster pigments, for example, titanium dioxide-covered mica and foils and powders of aluminum or the like; and dyes.

When the addition of a colorant to the high-modulus resin per se or the paper substrate per se to render a design suffices for pattern purposes, the provision of this pattern layer may be omitted.

Further, when the pattern layer is formed on the paper substrate, the paper substrate on its pattern layer forming surface may be, if necessary, previously coated with a conventional sealer.

[Surface Resin Layer]

The decorative sheet according to the present invention has a structure comprising a stack of the combinational layer and the surface resin layer. In this connection, "stacking (lamination)" refers to stacking (lamination) of the combinational layer and the surface resin layer on top of each other. Therefore, according to the present invention, methods for stacking (lamination) of the combinational layer and the surface resin layer on top of each other include: a method wherein the combinational layer and the surface resin layer are laminated onto each other; and a method wherein the surface resin layer is formed by coating on the combinational layer. Stacking of the surface resin layer onto the combinational layer by coating is preferred from the viewpoint of easiness in production.

The surface resin layer 4 is a layer as a surface layer constituting the outermost surface of the decorative sheet, and generally comprises a crosslinked product of an ionizing radiation-curable resin. This surface resin layer may be formed by coating an ionizing radiation-curable resin (composition), which has been brought to a liquid state, by a conventional coating method, such as gravure coating or roll coating, and exposing the coating to an ionizing radiation to crosslink the coating to produce a crosslinked product. The surface resin layer may also be formed by full solid printing, for example, by gravure printing. The amount of the resin used in the formation of the surface resin layer is generally about 1 to 30 g/m$^2$ on a solid basis in terms of the coverage.

Specifically, the ionizing radiation curable resin is preferably an ionizing radiation crosslinkable, curable composition prepared by properly mixing a prepolymer (including the so-called "oligomer") having in its molecule a radically polymerizable unsaturated bond or a cationically polymerizable functional group and/or a monomer having in its molecule a radically polymerizable unsaturated bond or a cationically polymerizable functional group. The term "ionizing radiation" used herein refers to electromagnetic waves or charged particles having energy which can polymerize and crosslink the molecule, and electron beam (EB) or ultraviolet light (UV) is generally used. In this connection, it should be noted that, as compared with the ultraviolet light, the electron beam is more likely to cause a deterioration in strength due to the cleavage of a cellulose molecule in the paper substrate, and, thus, the use of an ionizing radiation-curable resin of such a type that an electron beam irradiation is utilized for crosslinking can result in significant development of the effect of the present invention.

The prepolymer or monomer specifically comprises a compound having in its molecule, for example, a radically polymerizable unsaturated group, such as an (meth)acryloyl or (meth)acryloyloxy group, or a cationically polymerizable functional group, such as an epoxy group. These prepolymers and monomers may be used alone or as a mixture of two or more. Here, for example, the (meth)acryloyl group refers to an acryloyl or methacryloyl group. A polyene/thiol prepolymer comprising a combination of a polyene with a polythiol is also preferred as the ionizing radiation-curable resin.

Examples of prepolymers having a radically polymerizable unsaturated group in the molecule thereof include polyester (meth)acrylate, urethane (meth)acrylate, epoxy (meth)acrylate, melamine (meth)acrylate, and triazine (meth)acrylate. The molecular weight of the prepolymer is generally about 250 to 100,000. The (meth)acrylate refers to acrylate or methacrylate.

Examples of the monomer having in its molecule a radically polymerizable unsaturated group include: monofunctional monomers, such as methyl (meth)acrylate, 2-ethylhexyl (meth)acrylate, and phenoxyethyl (meth) acrylate; and polyfunctional monomers, such as diethylene glycol di(meth)acrylate, propylene glycol di(meth)acrylate, trimethylolpropane tri(meth)acrylate, trimethylolpropane ethylene oxide tri(meth)acrylate, dipentaerythritol tetra (meth) acrylate, dipentaerythritol penta(meth)acrylate, and dipentaerythritol hexa(meth)acrylate.

Examples of the prepolymer having in its molecule a cationically polymerizable functional group include prepolymers of epoxy resins, such as bisphenol type epoxy resin and novolak type epoxy compounds, and vinyl ether resins, such as fatty acid vinyl ether and aromatic vinyl ether.

Thiols include polythiols, such as trimethylolpropane trithioglycolate and pentaerythritol tetrathioglycolate. Polyenes include polyurethane, produced from a diol and a diisocyanate, with allyl alcohol being added to both ends thereof.

When ultraviolet light is used for crosslinking, it is common practice to add a photopolymerization initiator to the ionizing radiation-curable resin. In the case of the resin system having a radically polymerizable unsaturated group, acetophenones, benzophenones, thioxanthones, benzoin, and benzoin methyl ethers may be used, as the photopolymerization initiator, solely or as a mixture of two or more. On the other hand, in the case of the resin system having a cationically polymerizable functional group, for example, aromatic diazonium salts, aromatic sulfonium salts, aromatic iodonium salts, metallocene compounds, and benzoinsulfonic esters may be used, as the photopolymerization initiator, solely or as a mixture of two or more.

The amount of the photopolymerization initiator added is about 0.1 to 10 parts by mass based on 100 parts by mass of the ionizing radiation-curable resin.

If necessary, other various additives may be further added to the ionizing radiation-curable resin. Additives usable herein include, for example, antifriction materials described later, thermoplastic resins, such as vinyl chloride-vinyl acetate copolymer, vinyl acetate resin, acrylic resin, and cellulosic resin, extender pigments (fillers) in a fine powder form, such as calcium carbonate and barium sulfate, lubricants, such as silicone resin and wax, and colorants, such as dyes and pigments.

The antifriction material is optionally added to further improve the abrasion resistance. Antifriction materials usable herein include, for example, inorganic particles which are harder than the crosslinked product of the ionizing radiation-curable resin. Inorganic particles usable herein include alumina such as α-alumina, aluminosilicate, silica, glass, silicon carbide, boron nitride, and diamond particles. The inorganic particles may be spherical, polygonal (for example, cubic or regular octahedral), flaky, or irregular, or may have other shapes, and the form of the inorganic particles are not particularly limited. The average diameter of the inorganic particles is preferably about 3 to 30 μm. When the average particle diameter is below the above range, the effect of improving the abrasion resistance is lowered, while when the average particle diameter is above the above range, the smoothness of the surface is lowered. The amount of the inorganic particles added is about 5 to 30% by mass based on the total amount of the resin component.

Regarding the ionizing radiation, electron beam sources include those which can apply electrons having an energy of 100 to 1000 keV, preferably 200 to 300 keV, for example, various electron beam accelerators, such as Cockcroft-Walton accelerators, van de Graaff accelerators, resonance transformers, insulated core transformers, linear, dynamitron, and high-frequency electron accelerators, and ultraviolet sources usable herein include light sources, such as ultrahigh pressure mercury lamps, high pressure mercury lamps, low pressure mercury lamps, carbon arc lamps, black light lamps, and metal halide lamps. In general, the wavelength of the ultraviolet light used is mainly in the range of 190 to 380 nm.

[Decorative Material]

The lamination of the decorative sheet according to the present invention onto the surface of an adherend substrate with the aid of an adhesive provides the decorative material according to the present invention. A decorative material D shown in FIG. 2 (cross-sectional view) is one embodiment of the decorative material of the present invention. The decorative material D shown in FIG. 2 has a construction such that a decorative sheet S according to the present invention having a construction as illustrated in FIG. 1 has been laminated onto an adherend substrate 6 through an adhesive layer 5.

[Adherend Substrate]

The adherend substrate is not particularly limited. Examples of adherend substrates include inorganic nonmetallic, metallic, wood-based, and resin substrates. More specifically, inorganic nonmetallic substrates include those formed of inorganic materials, for example, non-clay ceramic materials, such as sheet-forming cement, extrusion cement, slag cement, ALC (lightweight cellular concrete), GRC (glass fiber-reinforced concrete), pulp cement, wood chip cement, asbestos cement, calcium silicate, gypsum, and gypsum slag, and ceramics, such as earthenware, pottery, porcelain, stoneware, glass, and enamel. Metallic substrates include those formed of metal materials, for example, iron, aluminum, and copper. Wood-based substrates include, for example, veneer, ply wood, particle board, fiber board, and laminated wood of cedar, cypress, oak, lauan, teak and the like. Resin substrates include those formed of, for example, resin materials, such as polypropylene, ABS resin, and phenolic resin.

The adherend substrate may have any shape, for example, may be in the form of a flat plate, a curved plate, or a polygonal column.

[Adhesive]

The adhesive as the adhesive layer 5 for bonding the decorative sheet to the adherend substrate is not particularly limited, and a suitable adhesive may be selected from conventional adhesives according to the material of the adherend substrate, applications, required properties and the like. Examples of adhesives usable herein include those comprising thermoplastic resins, such as polyamide resin, acrylic resin, and vinyl acetate resin, or thermosetting resins, such as thermosetting urethane resins. The adhesive may be applied by a conventional coating method such as roll coating. The adhesive is applied to the adherend substrate, the decorative sheet, or both the adherend substrate and the decorative sheet, and the decorative sheet is then laminated onto the adherend substrate.

When the high-modulus resin layer is present on the back surface of the decorative sheet, that is, the decorative sheet on its side where the adherend substrate is applied, the high-modulus resin layer may be allowed to serve also as the adhesive layer. This embodiment can be achieved, for example, by coating a high-modulus resin coating liquid onto a paper substrate and then bringing the coated paper substrate into contact bonding to an adherend substrate before the high-modulus resin is cured or dried.

[Applications]

The decorative sheet and decorative material according to the present invention may be used, without particular limitation, for example, in building interior materials, such as wall, floor or ceiling, fittings, such as doors, door frames, or sashes, fixture members, such as verandahes or baseboards, and furniture, such as chest of drawers or cabinets.

EXAMPLES

The following examples and comparative examples further illustrate the present invention. It should be noted that these examples are illustrative only and are not intended to limit the scope of the present invention.

Example A1

A decorative sheet S (a decorative paper) having a construction as shown in FIG. 1A was prepared as follows. A tissue paper, which comprises an L material pulp (a broad-leaved tree pulp) and has a basis weight of 30 g/m$^2$, for building materials was provided as a paper substrate 1 (a base paper). A high-modulus resin layer 2 (tensile strength 40 MPa) was formed using a polyester polyol having an average molecular weight of 20,000 at a coverage of 1 g/m$^2$ on a solid basis by gravure printing on the whole area of the back surface of the paper substrate 1. Subsequently, a full solid color print layer and a layer of a woodgrain pattern were successively formed by gravure printing to constitute a pattern layer 3 on the surface of the paper substrate 1. Thus, a printed paper was prepared. In this case, an ink comprising a binder (a mixed resin composed of an acrylic resin and nitrocellulose) and a colorant composed mainly of titanium white, chrome yellow, and red iron oxide was used for the formation of the full solid color print layer. On the other hand, an ink comprising a binder (a mixed resin composed of nitrocellulose and an alkyd resin) and a colorant composed mainly of red iron oxide and carbon black was used for the formation of the layer of a woodgrain pattern.

Further, an ionizing radiation-curable (electron beam-curable) resin coating composition comprising 60 parts by mass of a polyester acrylate prepolymer, 10 parts by mass of trimethylolpropane triacrylate, 29 parts by mass of 1,6-hexanediol diacrylate, and 1 part by mass of silicone acrylate was roll coated on the pattern layer in the printed paper at a coverage of 10 g/m$^2$ on a solid basis, followed by the application of an electron beam (175 keV, 30 kGy (3 Mrad)) to form a crosslinked product as a surface resin layer 4. Thus, a decorative sheet S was prepared.

Subsequently, 3 mm-thick MDF (medium-density fiber board) as an adherend substrate 6 was coated with vinyl acetate adhesive to form an adhesive layer 5, and the decorative sheet S was then applied by means of a roll laminator onto the coated adherend substrate 6 so that the backside (high-modulus resin layer) of the decorative sheet faced the adherend substrate. Thus, a decorative material (a decorative plate) according to the present invention as shown in FIG. 2 was prepared. That is, the decorative material D shown in FIG. 2 had a construction such that the decorative sheet S composed of the high-modulus resin layer 2, the paper substrate 1, the pattern layer 3, and the surface resin layer 4 provided in that order from the adherend substrate side was applied and laminated through the adhesive layer 5 onto the adherend substrate 6.

Example A2

A decorative sheet and a decorative material were prepared in the same manner as in Example A1, except that a high-modulus resin layer was stacked onto the backside of the paper substrate through an adhesive layer. A biaxially stretched isotactic polypropylene resin sheet having a thickness of 30 $\mu$m and a tensile strength of 40 MPa was used as the high-modulus resin layer. A two-component curable urethane resin adhesive composed of 100 parts by mass of polyester polyol and 8 parts by mass of 2,4-tolylene diisocyanate was coated onto the resin sheet at a coverage of 20 g/m$^2$ to form an adhesive layer, followed by bonding and lamination onto the backside of the paper substrate. A pattern layer and a surface resin layer were then formed on the laminate sheet (on its paper substrate surface) in the same manner as in Example A1.

Example A3

A decorative sheet was prepared in the same manner as in Example A1, except that the tensile strength of the high-modulus resin layer was 60 MPa. A decorative material was then prepared in the same manner as in Example A1, except that this decorative sheet was used.

Example A4

A decorative sheet was prepared in the same manner as in Example A3, except that the paper substrate was a tissue paper, which was formed of an N material pulp (a needle-leaved tree pulp) and had a basis weight of 30 g/m$^2$, for building materials. A decorative material was then prepared in the same manner as in Example A3, except that this decorative sheet was used.

Example B1

A decorative sheet was prepared in the same manner as in Example A1, except that the order of stacking of layers was changed. Specifically, in this example, the high-modulus resin layer 2, the pattern layer 3, and the surface resin layer 4 were formed in that order on the paper substrate 1. A decorative material was then prepared in the same manner as in Example A1, except that this decorative sheet was used.

Example B2

A decorative sheet was prepared in the same manner as in Example B1, except that the tensile strength of the high-modulus resin layer was 60 MPa. A decorative material was then prepared in the same manner as in Example B1, except that this decorative sheet was used.

Example B3

A decorative sheet was prepared in the same manner as in Example B2, except that the paper substrate was a tissue paper, which was formed of an N material pulp (a needle-leaved tree pulp) and had a basis weight of 30 g/m$^2$, for building materials. A decorative material was then prepared in the same manner as in Example B2, except that this decorative sheet was used.

Comparative Example 1

Figure 4:
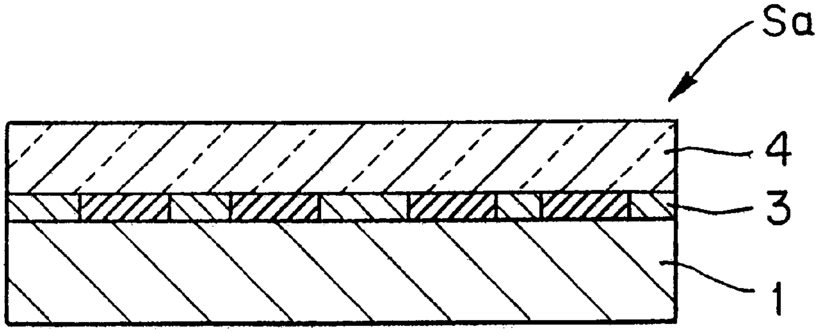
F I G. 4 PRIOR ART
FIG. 4 is a cross-sectional view showing one example of a conventional decorative sheet.

A decorative sheet Sa as shown in FIG. 4 was prepared in the same manner as in Example A1, except that the formation of the high-modulus resin layer was omitted. A decorative material was then prepared in the same manner as in Example A1, except that this decorative sheet was used.

Comparative Example 2

A decorative sheet was prepared in the same manner as in Example A1, except that the tensile strength of the high-modulus resin layer was 30 MPa. A decorative material was then prepared in the same manner as in Example A1, except that this decorative sheet was used.

Comparative Example 3

A decorative sheet was prepared in the same manner as in Example A1, except that the tensile strength of the high-modulus resin layer was 20 MPa. A decorative material was then prepared in the same manner as in Example A1, except that this decorative sheet was used.

[Evaluation of Performance]

The samples prepared in the examples and the comparative examples were evaluated for folding endurance (see Table 1 and FIG. 3) and processability (see Table 2).

(1) Folding Endurance: The number of times of reciprocation folding necessary for breaking of the specimen of the decorative sheet was evaluated as folding endurance according to TAPPI T 511 (folding endurance of paper (MIT tester)). The basis of this evaluation is such that the deterioration in strength of the paper substrate upon exposure to an ionizing radiation is considered attributable to intramolecular cleavage of cellulose and, thus, the folding endurance test as a method for measuring the strength of cellulose fibers is considered as a test which most sensitively reflects the influence of the intramolecular cleavage. The folding endurance was measured in two directions, MD (machine direction) and CD (cross direction) of the paper substrate.

Regarding the strength of the paper substrate, the strength in MD is higher due to the orientation of the fibers of the pulp. Upon a deterioration in strength as a result of the cleavage of cellulose by ionizing radiation irradiation, the strength in CD, which is originally low in strength, is further lowered. This poses a problem. More specifically, when a decorative sheet is subjected to lamination or other processing in the form of a continuous strip, the direction of tension for carrying the decorative sheet without slacking is MD. However, the occurrence of shaking of the adherend substrate during carrying, the step of cutting the decorative sheet and the like requires strength of the decorative sheet in the direction of tension (in MD), as well as in other direction. For this reason, the decorative sheet is likely to tear in a low strength direction. This is considered to render the strength in CD important. Therefore, the folding endurance as the processability is considered more important in CD than MD.

In relation to the processability described below, the folding endurance of the decorative sheet was measured and evaluated as a measure of the deterioration in strength of the paper substrate. Besides the folding endurance, for example, tear strength or tensile strength of the decorative sheet, the paper substrate with a high-modulus resin layer formed thereon or the like may be evaluated as the measure of the deterioration in strength of the paper substrate.

(2) Processability: In order to evaluate the processability, a decorative sheet in the form of a continuous strip was applied onto the adherend substrate with the aid of an adhesive by means of a roll laminator. In this case, the sheet was inspected for breaking (paper breaking). When breaking did not take place, the processability was evaluated as good, while when breaking took place, the processability was evaluated as failure.

TABLE 1

Results of measurement of folding endurance

| | Folding endurance, times | |
|---|---|---|
| | MD | CD |
| Ex. A1 | 568 | 150 |
| Ex. A2 | 563 | 152 |
| Ex. A3 | 623 | 189 |
| Ex. A4 | 940 | 278 |
| Ex. B1 | 568 | 150 |
| Ex. B2 | 623 | 189 |
| Ex. B3 | 940 | 278 |
| Comp. Ex. 1 | 389 | 74 |
| Comp. Ex. 2 | 423 | 98 |
| Comp. Ex. 3 | 476 | 118 |

Note:
MD and CD refer respectively to machine direction and cross direction of each paper.

TABLE 2

Results of evaluation of processability

| | Processability |
|---|---|
| Ex. A1 | ○ |
| Ex. A2 | ○ |
| Ex. A3 | ○ |
| Ex. A4 | ○ |
| Ex. B1 | ○ |
| Ex. B2 | ○ |
| Ex. B3 | ○ |
| Comp. Ex. 1 | X |
| Comp. Ex. 2 | X |
| Comp. Ex. 3 | X |

Note)
○: good, X: failure (sheet broken)

[Discussion of Results]

Figure 3:
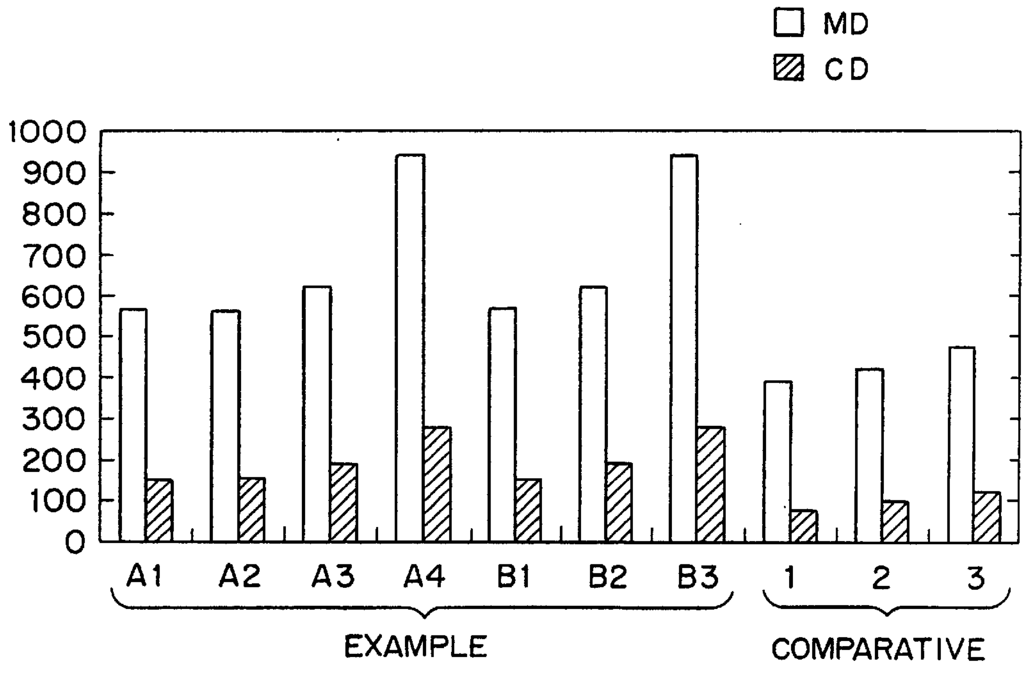
FIG. 3 is a diagram showing folding endurance for samples of examples and comparative examples.

At the outset, as shown in Table 1 and FIG. 3, the samples of the examples had higher folding endurance (larger) values in both MD and CD than the samples of the comparative examples. Further, for the samples of Example A4 and Example B3 respectively having the same construction as the samples of Example A3 and Example B2 except that the pulp of the paper substrate was changed from the L material to the N material, the folding endurance value was larger.

Further, as shown in Table 2, for all the samples of the examples, the processability was good by virtue of the provision of the high-modulus resin layer having a tensile strength of not less than 40 MPa. On the other hand, for the samples of the comparative examples, that is, for all of the sample of Comparative Example 1 wherein the provision of the high-modulus resin layer was omitted, and the samples of Comparative Examples 2 and 3 wherein the tensile strength was less than 40 MPa in spite of the provision of the resin layer, sheet breaking took place and, thus, the processability was failure.

Incidentally, for all the samples of the examples, the folding endurance (CD) was not less than 150 times, whereas for all the samples of the comparative examples, the folding endurance (CD) was less than 150 times and, even for the sample of Comparative Example 3 having the maximum value among the samples of the comparative examples, the folding endurance (CD) was 118. This suggests that the folding endurance value, which is preferred as a measure of the processability, is preferably not less than about 130 in CD.

What is claimed is:

1. A decorative sheet comprising a stack of:

(1) a surface resin layer formed of a crosslinked product of an ionization radiation-curable resin; and (2) a combinational layer comprising a combination of a paper substrate and a high-modulus resin having a tensile strength of not less than 40 MPa as measured according to JIS K 6301.

2. The decorative sheet according to claim 1, wherein the high-modulus resin is combined as a high-modulus resin layer with the paper substrate.

3. The decorative sheet according to claim 2, wherein the high-modulus resin layer is provided on the surface of the paper substrate in its surface resin layer side.

4. The decorative sheet according to claim 2, wherein the high-modulus resin layer is provided on the surface of the paper substrate remote from the surface resin layer.

5. The decorative sheet according to claim 1, wherein the high-modulus resin is combined with the paper substrate in such a state that the high-modulus resin has been impregnated into the paper substrate.

6. The decorative sheet according to claim 5, wherein the high-modulus resin is impregnated into the surface of the paper substrate on its surface resin layer side.

7. The decorative sheet according to claim 5, wherein the high-modulus resin is impregnated into the surface of the paper substrate remote from the surface resin layer.

8. The decorative sheet according to claim 1, wherein the paper substrate is formed of a needle-leaved tree pulp.

9. The decorative sheet according to claim 1, wherein the paper substrate comprises a pulp which, upon exposure to an ionizing radiation, causes the cleavage of a cellulose molecule as a component of the pulp to produce a carboxyl or carbonyl group at the cut end.

10. The decorative sheet according to claim 1, wherein the high-modulus resin is a thermoplastic resin or a thermosetting resin.

11. The decorative sheet according to claim 1, wherein the surface resin layer has been formed by exposing a prepolymer or a monomer having in its molecule a radically polymerizable unsaturated bond or a cationically polymerizable functional group to an ionizing radiation to cure the material.

12. The decorative sheet according to claim 1, wherein the surface resin layer contains an antifriction material.

13. A decorative material comprising the decorative sheet according to claim 1 laminated onto an adhered substrate.

14. The decorative sheet according to claim 1, wherein the tensile strength is within the range of 40 to about 90 MPa.

* * * * *